US009253347B2

(12) United States Patent
Asai

(10) Patent No.: US 9,253,347 B2
(45) Date of Patent: Feb. 2, 2016

(54) DATA PROCESSING DEVICE

(75) Inventor: Norihiko Asai, Tajimi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 551 days.

(21) Appl. No.: 13/425,468

(22) Filed: Mar. 21, 2012

(65) Prior Publication Data
US 2012/0326962 A1 Dec. 27, 2012

(30) Foreign Application Priority Data

Jun. 24, 2011 (JP) ................................. 2011-140698
Jan. 13, 2012 (JP) ................................. 2012-004744

(51) Int. Cl.
H04N 1/00 (2006.01)
G06F 3/12 (2006.01)

(52) U.S. Cl.
CPC .......... H04N 1/00474 (2013.01); G06F 3/1204 (2013.01); G06F 3/1226 (2013.01); G06F 3/1287 (2013.01); G06F 3/1292 (2013.01); H04N 1/00228 (2013.01); H04N 1/00233 (2013.01); H04N 1/00413 (2013.01); H04N 1/0023 (2013.01); H04N 1/00225 (2013.01); H04N 2201/0044 (2013.01); H04N 2201/0081 (2013.01); H04N 2201/0082 (2013.01); H04N 2201/0094 (2013.01)

(58) Field of Classification Search
None
See application file for complete search history.

(56) References Cited

U.S. PATENT DOCUMENTS

| 7,665,084 | B2 | 2/2010 | Suzuki et al. |
| 7,804,608 | B2 | 9/2010 | Shirai et al. |
| 7,984,120 | B2* | 7/2011 | Yoshida ........................ 709/220 |
| 8,010,583 | B2 | 8/2011 | Matsunaga |
| 8,306,977 | B1 | 11/2012 | Gildfind |
| 8,332,332 | B2 | 12/2012 | Carlson et al. |
| 8,356,084 | B2 | 1/2013 | Yamamoto |
| 2004/0034862 | A1 | 2/2004 | Kadota |
| 2004/0250265 | A1 | 12/2004 | Suzuki et al. |
| 2005/0018236 | A1 | 1/2005 | Shirai et al. |

(Continued)

FOREIGN PATENT DOCUMENTS

| EP | 2104328 A1 | 9/2009 |
| JP | 2000-066853 | 3/2000 |

(Continued)

OTHER PUBLICATIONS

Notice of Allowance issued in U.S. Appl. No. 13/166,044 mailed Apr. 21, 2014.

(Continued)

Primary Examiner — David D Davis
(74) Attorney, Agent, or Firm — Banner & Witcoff, Ltd.

(57) ABSTRACT

When a first device and a first attribute are specified, a data processing device registers the first device in association with first attribute and transmits an instruction to perform a process relating to the first attribute to the first device. If the first device possesses the second attribute, the data processing device registers the first device in association with the second attribute. The data processing device displays, on a display unit, a first image representing identification data of the first device when the second attribute is specified and the first device is registered in association with the second attribute. When the first image is selected, the data processing device transmits an instruction to perform a process relating to the second attribute to the first device corresponding to the selected first image.

20 Claims, 9 Drawing Sheets

(56) References Cited

U.S. PATENT DOCUMENTS

| | | | |
|---|---|---|---|
| 2006/0026600 A1* | 2/2006 | Yoshida | 719/310 |
| 2009/0013065 A1 | 1/2009 | Nagashima | |
| 2009/0237728 A1 | 9/2009 | Yamamoto | |
| 2010/0011369 A1 | 1/2010 | Uchida | |
| 2010/0328689 A1 | 12/2010 | Koo et al. | |
| 2011/0317211 A1* | 12/2011 | Yamada et al. | 358/1.15 |

FOREIGN PATENT DOCUMENTS

| | | |
|---|---|---|
| JP | 2001-125773 | 5/2001 |
| JP | 2001134399 A | 5/2001 |
| JP | 2004-078395 | 3/2004 |
| JP | 2004-171327 | 6/2004 |
| JP | 2004206229 A | 7/2004 |
| JP | 2004-302653 | 10/2004 |
| JP | 2004295181 A | 10/2004 |
| JP | 2005-044080 | 2/2005 |
| JP | 2006-041940 | 2/2006 |
| JP | 2006163990 A | 6/2006 |
| JP | 2006-185251 A | 7/2006 |
| JP | 2009-042902 A | 2/2009 |
| JP | 2009-187460 A | 8/2009 |
| JP | 2009205529 A | 9/2009 |
| JP | 2009-230253 A | 10/2009 |

OTHER PUBLICATIONS

Office Action issued in corresponding Chinese Patent Application No. 201110187870.0 mailed on Apr. 22, 2014.
Japanese office action for patent application No. 2010-147430 mailed Apr. 12, 2012.
Japanese office action for patent application No. 2011-067254 mailed Jun. 19, 2012.
Office Action received in corresponding Chinese Patent Application No. 201110187870.0 mailed Aug. 30, 2013.
Office Action received in corresponding Japanese Patent Application No. 2012-164441, mailed Aug. 20, 2013.
Final Office Action issued in U.S. Appl. No. 13/166,044 mailed Dec. 19, 2013.
Non-final Office Action received in U.S. Appl. No. 13/166,044 mailed Jun. 10, 2013.
Canon Easy-PhotoPrint for iPhone ver. 1.0.1 iTunes page—http://web.archive.org/web/20100314131751/http://itunes.apple.com/jp/app/canon-easy-photoprint-for/id331269951?mt=8. Dated Mar. 14, 2010. Retrieved Nov. 7, 2014.
Nov. 18, 2014—(US) Non-Final Office Action—U.S. Appl. No. 13/166,044.
Office Action received in corresponding Chinese Patent Application No. 201110187870.0 dated Oct. 23, 2014.
Sep. 11, 2014—(US) Non-Final Office Action—U.S. Appl. No. 14/339,733.
Sep. 9, 2014—(JP) Office Action—App 2013-087187—Eng Tran.
Aug. 25, 2014—(EP) Extended Search Report—App 11170793.1.
Mar. 24, 2015—(US) Final Office Action—U.S. Appl. No. 14/339,733.
May 15, 2015—(US) Final Office Action—U.S. Appl. No. 13/166,044.
Jul. 8, 2015—(US) Notice of Allowance—U.S. Appl. No. 14/339,733.

* cited by examiner

FIG.7

| | | MODEL NUMBER | IP ADDRESS | PRINT FUNCTION DATA | SCAN FUNCTION DATA | COPY FUNCTION DATA | DEFAULT DEVICE FLAG |
|---|---|---|---|---|---|---|---|
| PHOTO PRINT | 1 | INK-MFP331 | 211.9.36.148 | INKJET COLOR | WITH | WITH | ON |
| | 2 | LASER123 | 211.9.36.154 | LASER COLOR | WITHOUT | WITHOUT | — |
| | ... | ... | ... | ... | ... | ... | ... |
| WEB PRINT | 1 | INK-MFP331 | 211.9.36.148 | INKJET COLOR | WITH | WITH | ON |
| | 2 | LASER123 | 211.9.36.154 | LASER COLOR | WITHOUT | WITHOUT | — |
| | ... | ... | ... | ... | ... | ... | ... |
| SCAN | 1 | INK-MFP331 | 211.9.36.148 | INKJET COLOR | WITH | WITH | ON |
| | 2 | SCAN432 | 211.9.36.132 | WITHOUT | WITH | WITHOUT | — |
| | ... | ... | ... | ... | ... | ... | ... |

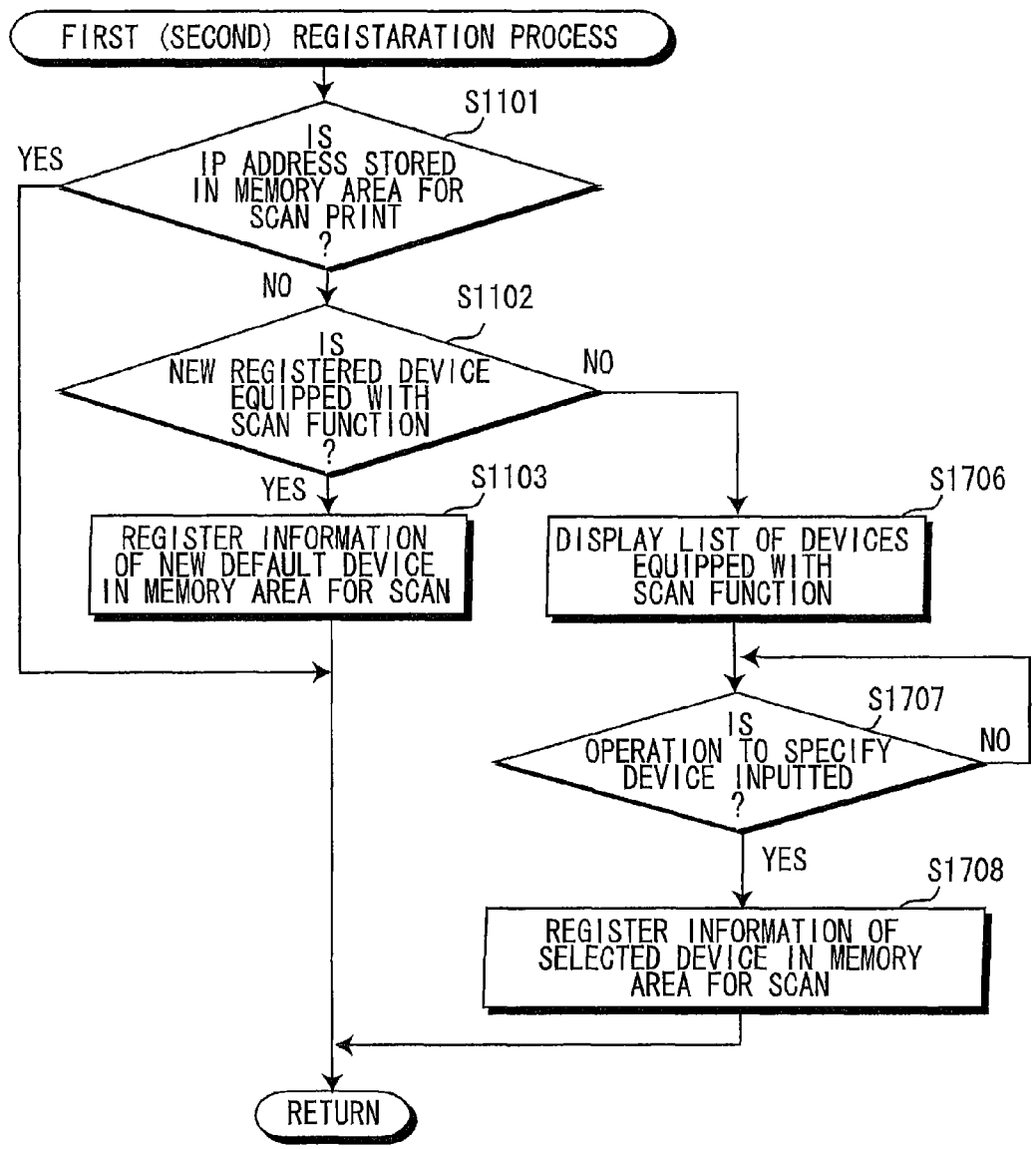

DATA PROCESSING DEVICE

CROSS REFERENCE TO RELATED APPLICATION

This application claims priority from Japanese Patent Application Nos. 2011-140698 filed Jun. 24, 2011 and 2012-004744 filed Jan. 13, 2012. The entire content of each of these priority applications is incorporated herein by reference.

TECHNICAL FIELD

The present invention relates to a data processing device.

BACKGROUND

Printing environments in which a user of a PC or other computer can select a desired printer from among a plurality of printers connected to a network and transmit a print command to the selected printer have become commonplace. The printer used most frequently by the user of the PC is registered as a default printer. Thereafter, the user can issue print commands on the PC to the printer registered as the default printer.

SUMMARY

However, in the event that the default printer registered according to the above conventional technology is unable to perform the desired process, the user is forced to select another printer capable of executing the desired process from among the printers for which drivers have been installed on the PC. The user must perform this selection every time the user wishes to perform the desired process. Since repeatedly performing this selection process is a great inconvenience to the user, it is desirable to provide an information processor capable of registering devices that are suitable for performing processes to achieve the desired use or devices that are suitable for handling the data used in such processes. However, in this case, the user would be required to perform troublesome operations in order to register the devices that are to be used for each use or for each type of data.

In view of the foregoing, it is an object of the invention to provide a data processing device, and a non-transitory computer readable storage medium storing data processing program for controlling the data processing device capable of designating devices to be used for executing processes according to various attributes, such as the type of use, type of data, and the like, while minimizing the user's burden.

In order to attain the above and other objects, the invention provides a data processing device connected with a first device. The data processing device includes a display unit, an operating unit configured to enable a user to input operation data, a processor, and a storage unit. The operating unit is configured to enable a user to input operation data. The storage unit stores computer readable instructions that, when executed by the processor, cause the data processing device to function as a device specifying unit, an attribute specifying unit, a first registering unit, a first transmitting unit, a second registering unit, a display control unit, an image selecting unit, and a second transmitting unit. The device specifying unit is configured to specify first identification data based on the operation data. The first identification data identifies the first device. The first device possesses a plurality of attributes including a first attribute. Each of the plurality of attributes relates to at least one process that can be executed by the first device. The attribute specifying unit is configured to specify one of the plurality of attributes based on the operation data.

The first registering unit is configured to register the first identification data in association with the first attribute into the storage unit when the device specifying unit specifies the first device and the attribute specifying unit specifies the first attribute. The first transmitting unit is configured to transmit an instruction to perform a process relating to the first attribute to the first device when the attribute specifying unit specifies the first attribute and the device specifying unit specifies the first device. The second registering unit is configured to register the first identification data in association with a second attribute other than the first attribute into the storage unit if the plurality of attributes further includes the second attribute when the first registering unit registers the first identification data in association with the first attribute into the storage unit. The display control unit is configured to display, on the display unit, a first image representing the first identification data when the attribute specifying unit specifies the second attribute and the first identification data is registered in association with the second attribute. The image selecting unit is configured to select the first image based on the operation data when the display, control unit displays the first image on the display unit. The second transmitting unit is configured to transmit an instruction to perform a process relating to the second attribute to the first device when the image selecting unit selects the first image.

According to another aspect, the present invention provides a method executed by a computer connected with a device. The method includes: specifying identification data identifying the device based on operation data inputted by a user, the device possessing a plurality of attributes including a first attribute, each of the plurality of attributes relating to at least one process that can be executed by the device; specifying one of the plurality of attributes based on the operation data; registering the identification data in association with the first attribute into the storage unit when the device is specified and the first attribute is specified; transmitting an instruction to perform a process relating to the first attribute to the first device when the first attribute is specified and the device is specified based on the operation data; registering the identification data in association with the second attribute into the storage unit if the plurality of attributes further includes the second attribute when the device is registered in association with the first attribute; displaying, on a display unit, an image representing the identification data when the second attribute is specified and the identification data is registered in association with the second attribute; selecting the image based on the operation data when the image is displayed on the display unit; and transmitting an instruction to perform a process relating to the second attribute to the device when the image is selected.

According to another aspect, the present invention provides a non-transitory computer readable storage medium storing a set of program instructions installed on and executed by a computer connected with a device. The program instructions includes: specifying identification data identifying the device based on operation data inputted by a user, the device possessing a plurality of attributes including a first attribute, each of the plurality of attributes relating to at least one process that can be executed by the device; specifying one of the plurality of attributes based on the operation data; registering the identification data in association with the first attribute into the storage unit when the device is specified and the first attribute is specified; transmitting an instruction to perform a process relating to the first attribute to the first device when the first attribute is specified and the device is specified based on the operation data; registering the identification data in association with the second attribute into the storage unit if the plurality of attributes further includes the second attribute when the device is registered in association with the first attribute; displaying, on a display unit, an image representing the identification data when the second attribute is specified and the identification data is registered in association with the second attribute; selecting the image based on the operation data when the image is displayed on the display unit; and transmitting an instruction to perform a process relating to the second attribute to the device when the image is selected.

BRIEF DESCRIPTION OF THE DRAWINGS

The particular features and advantages of the invention as well as other objects will become apparent from the following description taken in connection with the accompanying drawings, in which:

FIG. 7 is an explanatory diagram showing a table stored in a storage unit of the data processing device;

FIG. 10 is a flowchart illustrating steps in the first (second) registration process executed by a data processing device according to a modification of the invention, wherein a non-specified use is "Scan".

DETAILED DESCRIPTION

Figure 1:
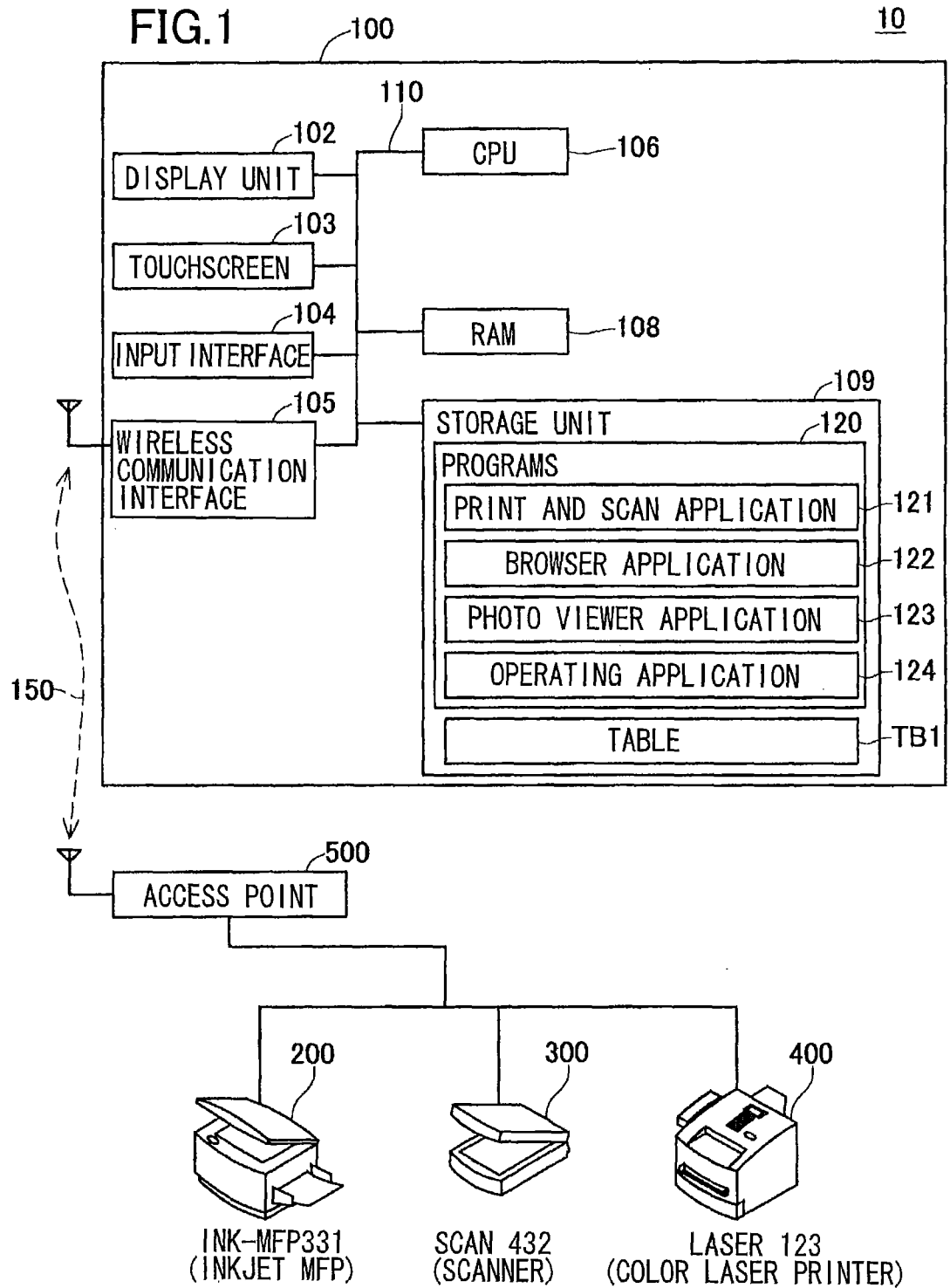
FIG. 1 is a block diagram conceptually illustrating data processing device and devices connected to the data processing device according to a first embodiment of the present invention.

As shown in FIG. 1, a network 10 includes a data processor 100, an inkjet-type multifunction peripheral (hereinafter "inkjet MFP") 200, a scanner 300, a color laser printer 400, and an access point 500. The data processor 100 is capable of communicating with the access point 500 through a wireless connection 150 on a wireless local area network (WLAN). The inkjet MFP 200, scanner 300, and color laser printer 400 are connected to the access point 500. The inkjet MFP 200 is a multifunction peripheral possessing a printer function, scanner function, and copier function. The data processor 100 can transmit a print command to the inkjet MFP 200 or color laser printer 400 via the access point 500 and can transmit a scan command to the inkjet MFP 200 or scanner 300 via the access point 500 by executing a print-and-scan application described later. In other words, the data processor 100 can use the inkjet MFP 200, scanner 300, and color laser printer 400 through the access point 500.

The data processor 100 is a portable device, such as a mobile phone or portable terminal device. The data processor 100 includes a display unit 102, a touchscreen 103, an input interface 104, a wireless communication interface 105, a CPU 106, a RAM 108, and a storage unit 109, all of which components are interconnected via an input/output port 110.

The display unit 102 receives image data outputted from the CPU 106 and displays images based on this image data. The display unit 102 may be configured of an LCD or an organic EL panel, for example. The touchscreen 103 is a transparent member disposed so as to cover the surface of the display unit 102. The touchscreen 103 detects positions relative to the display unit 102 that were touched by the user's finger or the like and outputs positional data for the detected positions to the CPU 106. In the following description, the CPU 106 receiving positional data from the touchscreen 103 may be expressed as the CPU 106 receiving a "touch" for example. The input interface 104 is an operating button, for example. The data processor 100 starts up when the input interface 104 is pressed. The wireless communication interface 105 enables the data processor 100 to communicate with the access point 500 through the wireless connection 150.

The CPU 106 executes programs stored in the storage unit 109. The RAM 108 temporarily stores data required in processes performed by the CPU 106. The storage unit 109 is configured of a combination of flash memory, a hard disk, a buffer provided for the CPU 106, and the like. The storage unit 109 can also store image data, document data, and the like. Further, as will be described later in detail, the storage unit 109 stores identification data identifying default devices for each purpose.

The storage unit 109 also stores programs 120. The programs 120 include a print-and-scan application 121, a browser application 122, a photo viewer application 123, and an operating system 124. The CPU 106 executes processes according to the programs 120 stored on the storage unit 109. In the following description, the CPU 106 executing a program, such as the print-and-scan application 121 or operating system 124, may simply be referred to by the program name. For example, the print-and-scan application 121 may be used in the following description to denote the "CPU 106 executing the print-and-scan application 121." The print-and-scan application 121 is an application program for controlling the CPU 106 to execute such operations as issuing a print command from the data processor 100 to the inkjet MFP 200 or the like. The browser application 122 is an application program for controlling the display unit 102 to display Web page data. The photo viewer application 123 is an application program for controlling the CPU 106 to execute processes by which a user can create, edit, and save image files. The operating system 124 is a program that provides basic functions shared by the print-and-scan application 121 and the like. The operating system 124 includes programs for controlling the wireless communication interface 105 to execute wireless communications over the wireless connection 150.

The storage unit 109 also stores a table TB1. FIG. 7 shows an example of the table TB1. In this example, the table TB1 is provided with storage areas corresponding to three purposes; a photo print 611, a Web print 612, and a scan 613. Data on a device suitable for a photo print is stored in the storage area corresponding to the photo print 611. If the "photo print" is selected, the data processor 100 executes a process hereinafter referred to as a photo print process to transmit a print request for printing JPEG, bitmap, GIF, or other image data to a device having a print function, directing the device to perform a printing operation. Data on a device suitable for a Web print is stored in the storage area corresponding to the Web print 612. If the "Web print" is selected, the data processor 100 performs a process hereinafter referred to as a Web page print process for transmitting a print request for printing a Web page to a device having a print function, directing the device to perform a printing operation. Data on a device suitable for a scan is stored in the storage area corresponding to the Scan 613. When the "Scan" is selected, the data processor 100 performs a process hereinafter referred to as a scan process for transmitting a scan request to a device having a scan function, directing the device to perform a scanning operation. An inkjet printer is one example of a device suitable for printing photos because an inkjet printer can print on gloss photo paper. Examples of devices suitable for printing Web pages are a color inkjet printer and a color laser printer having a color printing function.

The table TB1 stores data related to the devices, including identification data 600, function data 604, and a default device flag 608. The identification data 600 is information for identifying the device and includes a model number 601, and an IP address 602. The model number 601 is information for identifying the type of device. In the first embodiment, the model number 601 for the inkjet MFP 200 is "Ink-MFP331," For the scanner 300, the model number 601 is "Scan432." The color laser printer 400 has a model number 601 of "Laser123," The IP address 602 is an identification number used in communications that is assigned to each device. The function data 604 is information indicating functions possessed by each device. The function data 604 includes print function data 605, scan function data 606, and copy function data 607. The print function data 605 is data indicating what type of printing functions a device possesses. The scan function data 606 is data indicating whether the device possesses a scanning function. The copy function data 607 is data indicating whether the device possesses a copy function.

The example of the table TB1 shown in FIG. 7 indicates that the model number 601 of "Ink-MFP331" (the inkjet MFP 200) and "Laser123" (the color laser printer 400) can be used for the photo print 611 and Web print 612. The table TB1 also indicates that devices having the model number 601 of "Ink-MFP331" (the inkjet MFP 200) and "Scan432" (the scanner 300) can be used for the scan 613.

The default device flag 608 is data for indicating default devices. One default device is set for, each type of use. When there is a plurality of devices capable of executing processes related to a certain use, the default device indicates the device to be given priority over the other devices. The first embodiment describes a configuration in which the last device that was used for a use is set as the default device. In other words, each device possesses at least one attribute indicating a type of use achieved by the device.

Next, a control process performed by the CPU 106 to control other components of the data processor 100 will be described with reference to FIGS. 2 through 8. The CPU 106 performs the control process according to the print-and-scan application 121. The print-and-scan application 121 starts up when the user touches an area on the touchscreen 103 corresponding to a prescribed application icon associated with the print-and-scan application 121. The control process of FIG. 2 begins when the print-and-scan application 121 starts.

Figure 2:
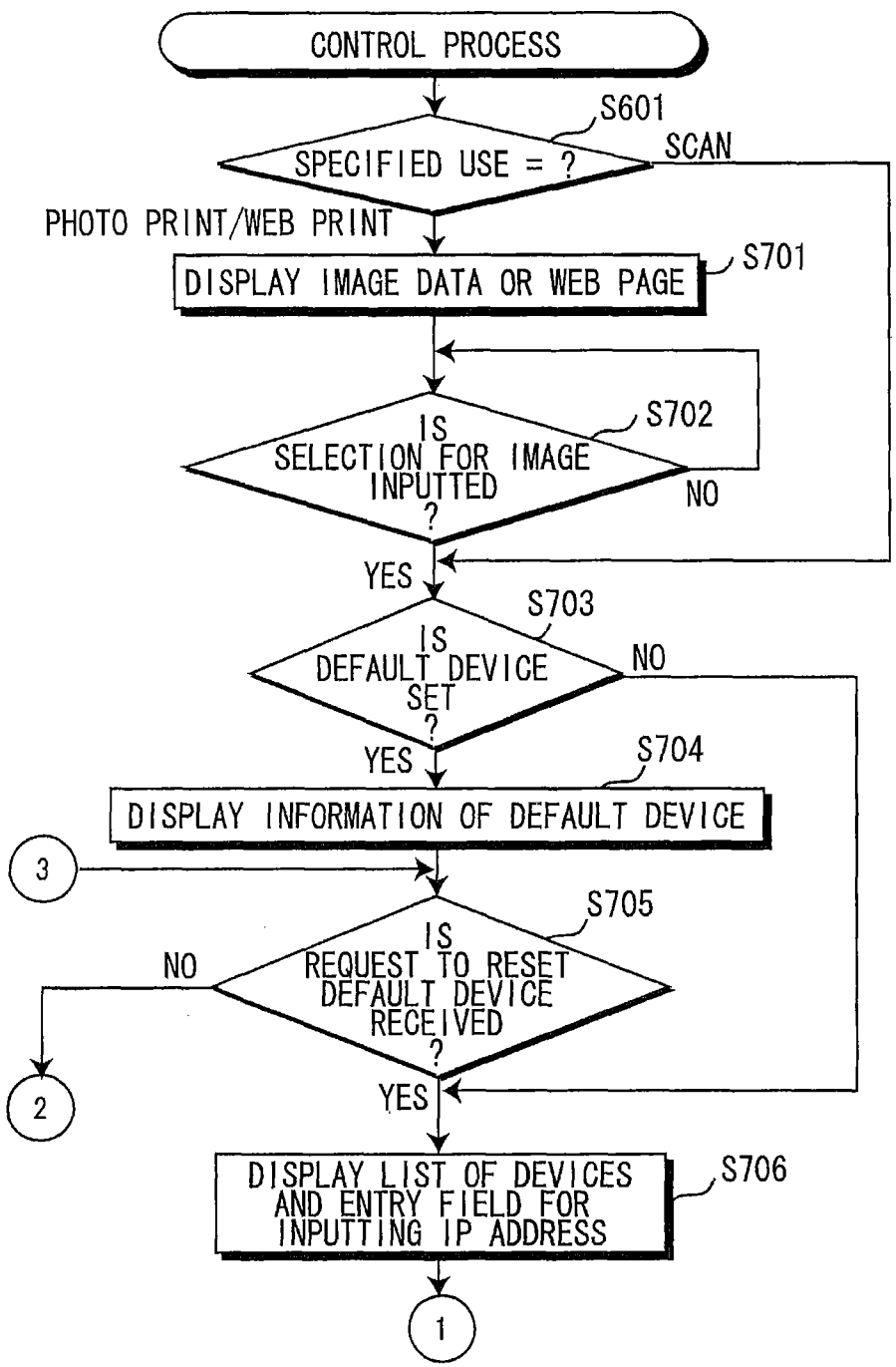
FIGS. 2 and 3 are flowcharts illustrating steps in a process executed by the data processing device according to a print and scan application in the first embodiment.

In S601 of FIG. 2 the CPU 106 receives a use-specifying operation specifying one of the three uses "Photo print," "Web print," and "Scan." More specifically, the CPU 106 controls the display unit 102 to display icons corresponding to the three uses described above. When the CPU 106 receives input indicating that the user touched a region in which an icon is displayed, the CPU 106 determines that the use corresponding to the touched icon has been specified. The CPU 106 advances to S703 when the specified use is "Scan" and advances to S701 when the specified use is either "Photo print" or "Web print."

When the specified use is "Photo print" ("Photo print" in S701), the CPU 106 displays a list of thumbnails in the display unit 102 for image data stored in the storage unit 19. When it is not possible to display all of the thumbnails in the display unit 102 at one time, the display may be configured so that the user can view all thumbnails by scrolling. When the specified use is "Web print" ("Web print" in S701), the CPU 106 displays in the display unit 102 a Web page specified by the user and an icon to transmit a print command for the Web page.

In S702 the CPU 106 determines whether or not a selection for image subject to be printed was inputted. Specifically, the CPU 106 determines whether or not a region of the display unit 102 in which a thumbnail or icon is displayed was touched by the user. When the region is touched (S702: YES), the CPU 106 determines that an instruction to perform a print process on image data corresponding to the thumbnail displayed in the display unit 102 or an instruction to perform a print process on Web page displayed in the display unit 102 is inputted, and then advances to S703. When a selection for image has been not inputted, the CPU 103 continues to loop back to S702 and repeat the determination while determining that an image data selection has not been inputted (S702: NO).

In S703 the CPU 106 determines whether a default device has been set for the use specified in S601. To make this determination, the CPU 106 references the storage area of the table TB1 corresponding to the specified use and determines whether the default device flag 608 is set to "on" for any device. The CPU 106 advances to S706 when determining that a default device has not been set (S703: NO) and continues to S704 when determining that a default device has been set (S703: YES).

In S704 the CPU 106 displays on the display unit 102 data identifying the device set as the default (the model number 601, etc.), an icon for requesting to reset the default device, and an icon for issuing a command to execute the specified use. In S704 the CPU 106 does not display data identifying any device other than the default device. That is, priority is given to displaying the default device on the display unit 102 over other devices.

In S705 the CPU 106 determines whether or not a request to reset the default device was received. Here, "resetting the default device" denotes reselecting a different device from the device currently set as the default device to be the new default device for the specified use. Specifically, the CPU 106 determines whether or not the user touched an area of the touchscreen 103 corresponding to the area on the display unit 102 in which the icon for requesting to reset the default device is displayed. The CPU 106 advances to S709 when determining that a request to reset the default device was not received (S705: NO) and continues to S706 when determining that a request to reset the default device was received (S705: YES).

In S706 the CPU 106 displays on the display unit 102 a list of devices supporting the specified use. The list of devices displayed on the display unit 102 includes the model number 601 and IP address 602 stored in the table TB1 in association with the specified use. The CPU 106 also displays an entry field on the display unit 102 for inputting the IP address of a new device to be used for implementing the specified use. Hence, in S706 the CPU 106 also accepts the registration of a new device. Here, "registration" denotes a process for storing device data required to control the device identified by the inputted IP address in the table TB1 in association with the specified use. The device data stored in the table TB1 includes the model number 601, IP address 602, and function data 604.

Figure 8:
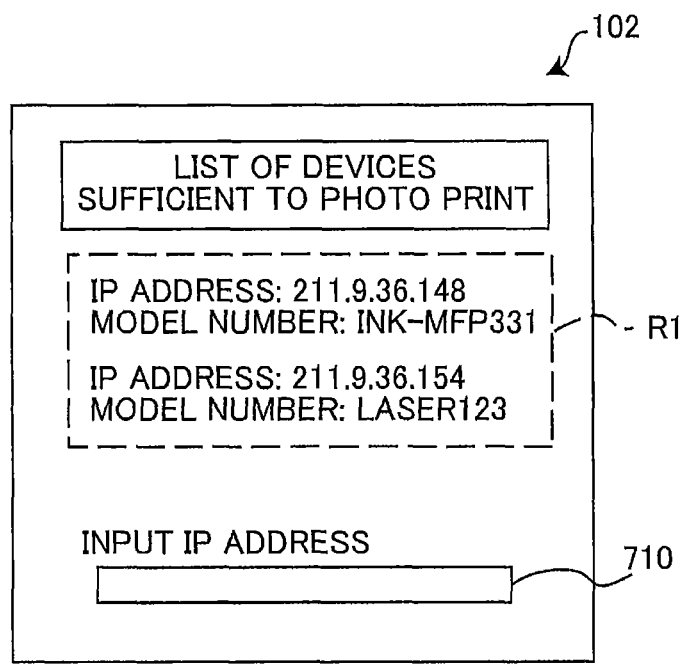
FIG. 8 is a diagram showing an example of display screen displayed on a display unit of the data processing device.

FIG. 8 shows a sample display on the display unit 102 for the case in which "Photo print" was selected as the specified use. In the example of FIG. 8, two devices (the inkjet MFP 200 and color laser printer 400) stored in the table TB1 (FIG. 7) in association with the photo print 611 are displayed in a list. More specifically, the model numbers 601 ("Ink-MFP331" and "Laser123") and the IP addresses 602 (211.9.36.148 and 211.9.36.154) of these devices are displayed in a region R1 of the display unit 102. In addition, an entry field 710 is displayed in the display unit 102 for receiving user input specifying the IP address of the device to be newly registered. Alternatively, if "Scan" was selected as the specified use, the CPU 106 would display in the display unit 102' model numbers 601 ("Ink-MFP331" and "Scan432") and the IP addresses 602 (211.9.36.148 and 211.9.36.132) of the two devices stored in the table TB1 in association with the scan 613 (the inkjet MFP 200 and scanner 300), and an entry field for inputting an IP address.

Only device data for devices possessing the functions required to execute processes supporting the specified use are displayed in the display unit 102 in S706. In this embodiment, the device data displayed in the display unit 102 includes only the model number and IP address of each device. Hence, devices capable of implementing the specified use are given priority over devices incapable of implementing the specified use when displaying data in the display unit 102.

In S707 (FIG. 3) the CPU 106 determines whether or not an operation for inputting the IP address of a device to be registered (an IP-address-inputting operation) or an operation for selecting the displayed model number 601 or the like (a device-specifying operation) was performed on the touchscreen 103. The CPU 106 advances to S708 when a device-specifying operation was executed (S707: device-specification) and advances to S707a when an IP-address-inputting operation was executed (S707: IP address input).

In S707a the CPU 106 stores the inputted IP address in the table TB1 in association with the specified use. The CPU 106 also controls the wireless communication interface 105 to acquire the model number 601 and function data 604 corresponding to the inputted IP address and stores this data in the table TB1 in association with the IP address. Here, the method of acquiring and storing the model number 601 and function data 604 will be described.

The CPU 106 controls the wireless communication interface 105 to broadcast a packet over the network to which the data processor 100 is connected requesting devices possessing a color print function to return their model numbers 601 and information 604 related to the functions they possess. In response, the requested data is returned from devices connected to the network having a color print function. The wireless communication interface 105 receives packet data including the device model number 601 and function information 604. The packet data received by the wireless communication interface 105 further includes the IP address 602 of the device as the source address and the IP address of the data processor 100 as the destination address. The CPU 106 stores the in the table TB1 the model number 601 and functional information 604 received by the wireless communication interface 105 in association with the specified use. In this case, the CPU 106 stores the IP address 602 matching the inputted IP address and the model number 601 of the device found in the packet that includes this IP address in the table TB1 in association with the specified use. Alternatively, instead of issuing a broadcast, the CPU 106 may transmit a packet to the inputted IP address requesting the device to return its model number 601 and function data 604.

Further, when a plurality of IP addresses match the IP address inputted in the IP-address-inputting operation from among IP addresses received by the wireless communication interface 105, such as when the user inputs a partial IP address, the CPU 106 may store all of the plurality of IP addresses and the model number 601 and function data 604 of the device possessed by the packet including each IP address in the table TB1 in association with the specified use. Further, when there is a plurality of IP addresses that match the inputted IP address, the CPU 106 may store a single IP address selected by the user from among the plurality of IP addresses and the model number 601 and function data 604 of the device in the packet including this IP address in the table TB1 in association with the specified use.

In S708 the CPU 106 sets the default device to the device associated with the IP address inputted in S707 (S707: IP address input) or the user-selected device (S707: device specification). More specifically, the CPU 106 sets the default device flag 608 to "on" in the table TB1 only for this device and sets the default device flag 608 for all other devices to "off." In S708 the CPU 106 displays a screen on the display unit 102 for executing the specified use.

In S709 the CPU 106 determines whether or not a command to execute the specified use was received. Specifically, the CPU 106 determines whether a region of the screen for executing the specified use in which an icon corresponding to the specified use is displayed was inputted by the user. The CPU 106 advances to S710 upon determining that the command to execute the specified use was inputted (S709: YES) and returns to S705 upon determining that a command to execute the specified use was not inputted (S709: NO).

In S710 the CPU 106 transmits a command to the default device to execute the specified use. If the specified use is "Photo print," for example, the CPU 106 uses the IP address 602 read from the table TB1 to transmit a print command for printing image data received as the print target in S702 to the default device. If the specified use is "Web print," the CPU 106 transmits a print command to the default device to print a Web page received as the print target in S702. When the specified use is "Scan," the CPU 106 uses the IP address 602 read from the table TB1 to transmit a scan command to the default device. The CPU 106 subsequently controls the wireless communication interface 105 to receive scan data returned from the default device.

In S710a the CPU 106 determines whether or not a device was newly registered in S707. That is, the CPU 106 determines whether or not the operation performed in S707 was an IP-address-inputting operation. The CPU 106 ends the process if a device was not newly registered (S710a: NO) and advances to S711 if a device was newly registered (S710a: YES).

In S711 the CPU 106 performs a first registration process for storing the newly registered device in association with a first non-specified use. In S712 the CPU 106 performs a second registration process for storing the newly registered device in association with a second non-specified use. Here, the newly registered device denotes the device identified by the IP address inputted in S707. For example, when "Photo print" was the use selected in S601, the CPU 106 stores the newly registered device in association with "Web print" (the first non-specified use) in the first registration process and stores the newly registered device in association with "Scan" (the second non-specified use) in the second registration process. Alternatively, if "Web print" was the use selected in S601, the CPU 106 stores the newly registered device in association with "Scan" (the first non-specified use) in the first registration process and stores the newly registered device in association with "Photo print" (the second non-specified use) in the second registration process. Similarly, if "Scan" was the use selected in S601, the CPU 106 stores the newly registered device in association with "Photo print" (the first non-specified use) in the first registration process and stores the newly registered device in association with "Web print" (the second non-specified use) in the second registration process.

Figure 4:
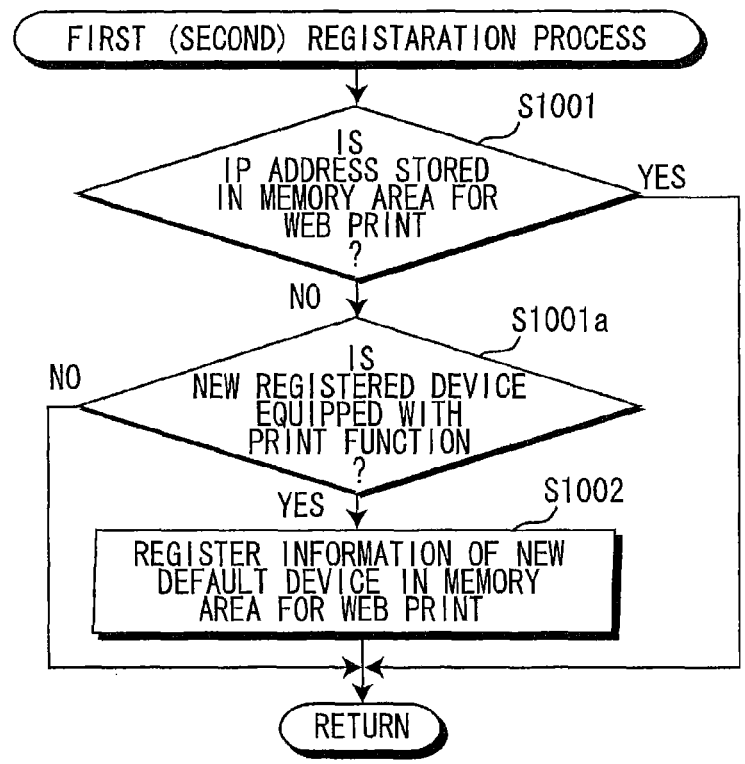
FIG. 4 is a flowchart illustrating steps in a first (second) registration process in the process of FIG. 3 wherein a non-specified use is "Web print"

Next, the first registration process (S711) or the second registration process (S712) will be described with referring to FIG. 4. FIG. 4 is a flowchart illustrating steps in a process to store identification data for the first non-specified use ("Web print"). In S1001 the CPU 106 determines whether or not the IP address inputted in S707 is stored in a memory area allocated in the table TB1 for "Web print". When the IP address is stored in the memory area (S1001: YES), the CPU 106 ends this subroutine. When the IP address is not stored in the memory area (S1001: NO), the CPU 106 advances to S1001a. In 1001a, the CPU 106 determines whether or not a device possesses printing function. Specifically, the CPU 106 determines whether or not the print function information 605 corresponding to the new-registered device registered in S707a indicates one of "inkjet colors" and "laser color." If the new-registered device possesses printing function (81001a: YES), the CPU advances to S1002. If the new-registered device does not possess the printing function (S1001a: NO), the CPU 106 ends this subroutine. In S1002 the CPU 106 stores the IP address 602, the model number 601, and the function information 604 of the new-registered device, in the memory area of the table TB1 for the Web print 612. The CPU 106 ends the subroutine.

Figure 5:
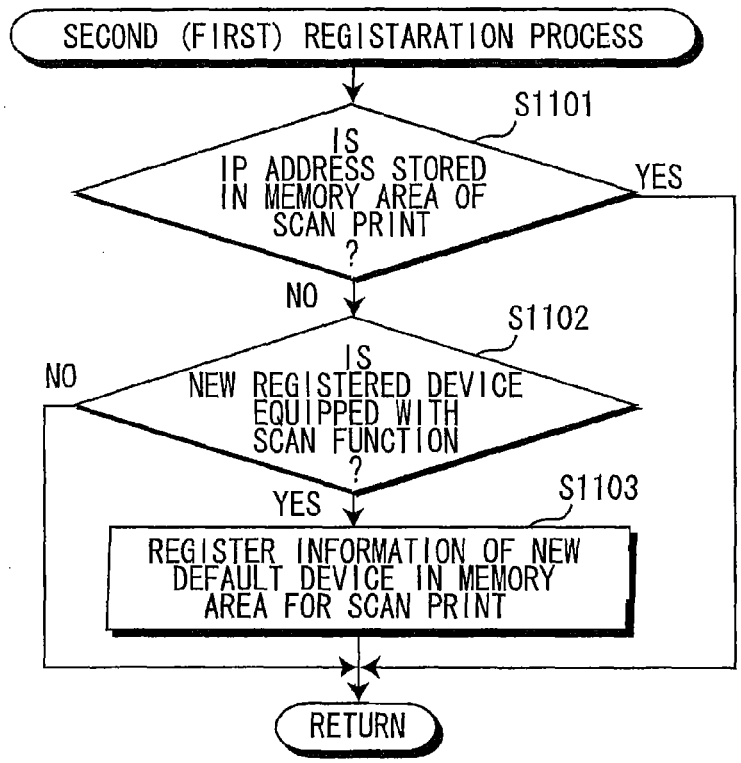
FIG. 5 is a flowchart illustrating steps in the first (second) registration process in the process of FIG. 3 wherein a non-specified use is "Scan"

Next, the first registration process (S711) or the second registration process (S712) will be described with referring to FIG. 5. FIG. 5 is a flowchart illustrating steps in a process to store identification data for the second non-specified use ("Scan"). In S1101 the CPU 106 determines whether the IP address inputted in S707 is stored in a memory area 613 allocated in the table TB1 for "Scan". When the IP address is stored in the memory area 613 (S1101: YES), the CPU 106 ends this subroutine. When the IP address is not stored in the memory area 613 (S1101: NO), the CPU 106 advances to S1102.

In 1102, the CPU 106 determines whether or not a device possesses a scanning function. Specifically, the CPU 106 determines whether or not the scan function information 606 corresponding to the new-registered device registered in S707a indicates "with." If the new-registered device possesses the scanning function (S1002: YES), the CPU advances to S1003. If the new-registered device does not possess the scanning function (S1002: NO), the CPU 106 ends this subroutine. In S1003 the CPU 106 stores the IP address 602, the model number 601, and the function information 604 of the new-registered device, in the memory area 613 of the table TB1 for the Scan.

Figure 6:
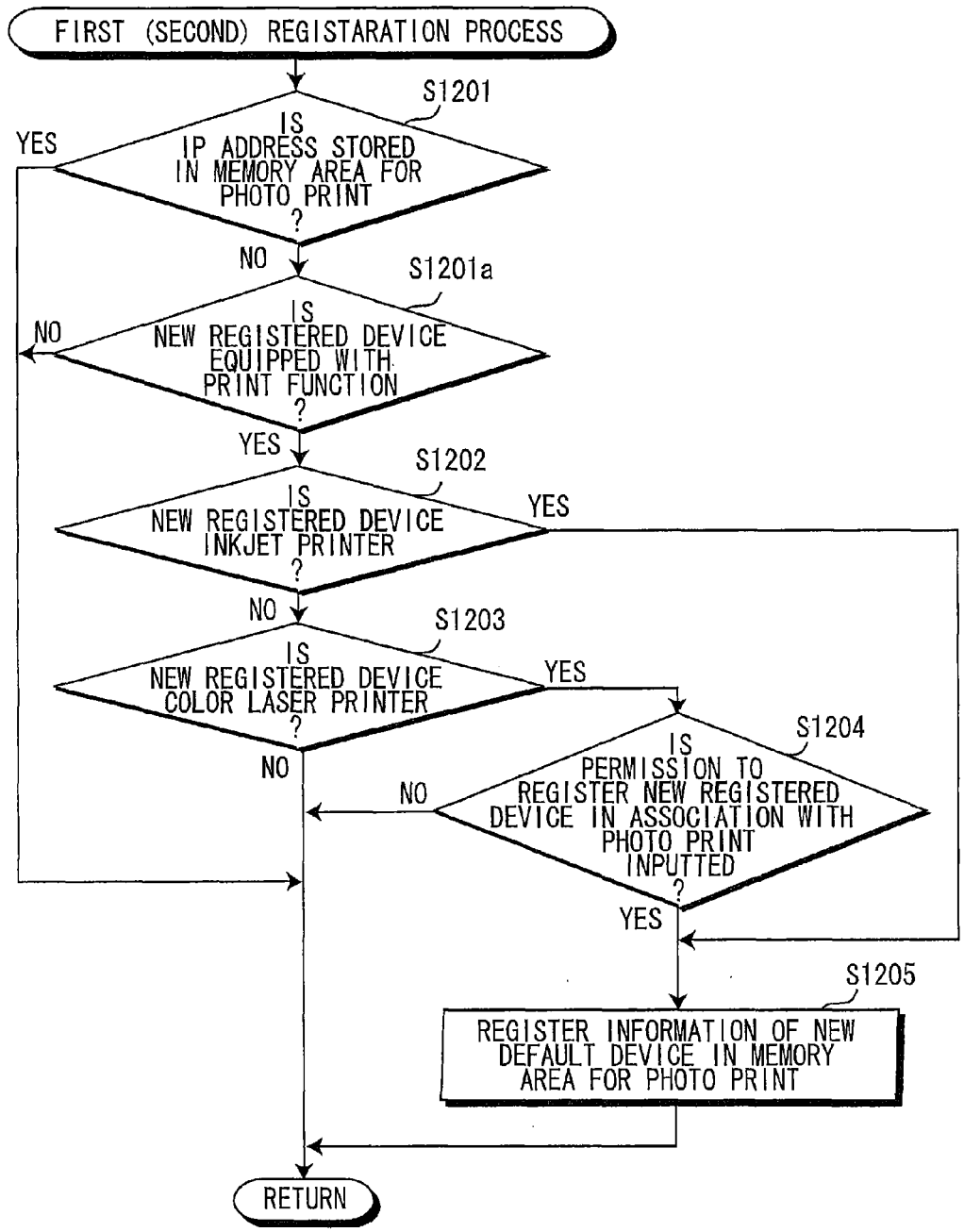
FIG. 6 is a flowchart illustrating steps in the first (second) registration process in the process of FIG. 3 wherein a non-specified use is "Photo print"

Next, a process for storing the newly registered device in association with the non-specified use "Photo print" will be described with reference to FIG. 6. FIG. 6 is a flowchart illustrating steps in the first registration process of S711 or the second registration process of S712. In S1201 of FIG. 6, the CPU 106 determines whether or not the IP address inputted by the user in S707 to register a new device is already stored in the table TB1 in association with the photo print 611. The process ends if the IP address is already stored in the table TB1 (S1201: YES) and advances to S1201a if the IP address is not stored in association with the photo print 611 (S1201: NO). In S1201a the CPU 106 determines whether or not the newly registered device possesses a printer function. The specific method of determination is identical to the method described in S1001a. The process ends if the newly registered device does not possess a printer function (S1201a: NO) and advances to S1202 if the newly registered device possesses a printer function (S1201a: YES).

In S1202 the CPU 106 determines whether or not the new registered device is an inkjet printer. Specifically, the CPU 106 determines whether or not the print function information 605 indicates "inkjet color." The CPU 106 advances to S1205 when the newly-registered device is an inkjet printer (S1202: YES) and advances to S1203 when the newly-registered device is not an inkjet printer (S1202: NO).

In S1203 the CPU 106 determines whether the newly-registered device is a color laser printer. Specifically, the CPU 106 determines whether or not the print function information 605 indicates "laser color." The CPU 106 advances to S1204 when the newly-registered device is a color laser printer (S1203: YES). However, if the newly-registered device is not a color laser printer (S1203: NO), the CPU 106 ends the subroutine process.

In S1204 the CPU 106 displays in the display unit 102 a message querying the user whether it is OK to store the IP address of the color laser printer corresponding to the newly-registered device as identification data for the "photo print". The CPU 106 receives an input indicative of OK or NO from the user. If an input giving permission was inputted (S1204: YES), the CPU 106 advances to S1205. On the other hand, if the input giving permission is not inputted (S1204: NO), the CPU 106 determines ends the subroutine process.

In S1205 the CPU 106 stores the IP address 602, model number 601, and function information 604 of the newly-registered device in a memory area 611 of the table 18 for the photo print. Then, the CPU 106 ends the current subroutine process.

The data processor 100 according to the first embodiment described above has the following effects. When the user registers the IP address of a new device in order to perform a process involving the specified use (S707a), the data processor 100 automatically stores the IP address and the like of this device in association with not only the specified use, but also the other uses (S711, S712). This eliminates the necessity to perform such user operations as inputting the IP address and the like of the newly registered device for each type of use, thereby making the system more user-friendly.

The data processor 100 also displays a list of devices suitable for the specified use on the display unit 102 (S706). When the user performs an operation to select one of the model numbers 601 or the like displayed on the display unit 102 (S707: device specification), the data processor 100 controls the selected device to execute a process related to the specified use (S710). In this way, the data processor 100 can simplify the user operations for selecting a device to execute the process related to the specified use.

The data processor 100 does not execute the first registration process (S711) and second registration process (S712) for storing the newly registered device in association with the non-specified uses when the newly registered device stored in the table TB1 in association with the specified use in S707a is already stored in the table TB1 in association with non-specified uses (S1001, S1101, S1201: YES). This method can prevent redundant execution of the registration process.

The data processor 100 also does not execute the first registration process (S711) and the second registration process (S712) when the newly registered device does not possess functions suitable for the specified use (S1001a, S1102, S1201a: NO). As a result, when displaying on the display unit 102 a list of devices supporting the specified use (S706), the CPU 106 displays only those devices capable of executing processes related to the specified use. This can prevent such situations as the user specifying a device through a device-specifying operation (S707) that is incapable of executing a process related to the specified use.

If a default device has been set (S703: YES), the data processor 100 displays only information on this default device (S704). In other words, the data processor 100 gives priority to displaying the default device on the display unit 102 over other devices not set as the default. In this way, the user can more easily select the default device that was set in S708, i.e., the last device that the user used.

When displaying a list of devices suitable for the specified use (S706), the data processor 100 displays information only on devices having the functions necessary for executing processes related to the specified use. In other words, the data processor 100 gives priority to displaying on the display unit 102 devices capable of implementing the specified use over devices incapable of implementing the specified use, thereby facilitating the user in selecting a device suited for the specified use.

When storing a newly registered device in association with the non-specified use "Photo print" (S711, S712), the data processor 100 executes the registration process (S1205) only when the newly registered device is a color laser printer (S1203: YES) and only if the user grants permission (S1204: YES) because an inkjet printer is generally more favorable than a color laser printer from the perspectives of cost and printing results when the device is used for the purpose of printing photos. Specifically, since most color laser printers cannot print on gloss photo paper, an inkjet printer, which is capable of printing on gloss photo paper is preferable when the intended use is printing photos. In this way, the data processor 100 can reflect the user's wishes in the registration process.

Figure 9A:
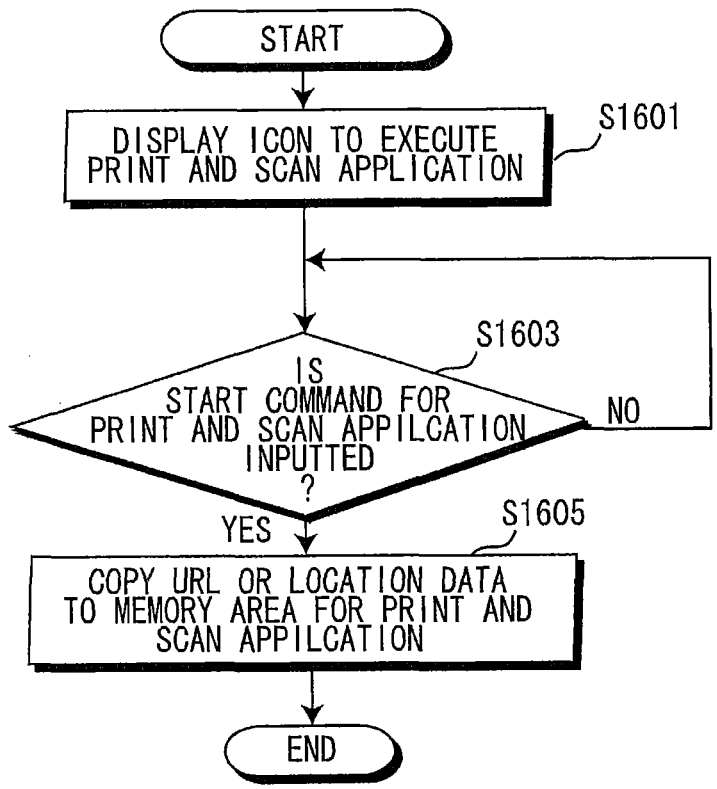
FIGS. 9A and 9B are flowchart illustrating steps in a process for starting the print and scan application executed by the data processing device according to a second embodiment of the present invention.

Next, a second embodiment will be described with reference to FIGS. 9A and 9B. In the second embodiment, the print-and-scan application 121 is started after data to be used in the process executed by a device has been specified. The structures of the network 10 and data processor 100 according to the second embodiment are identical to those in the first embodiment.

The process for starting the print-and-scan application 121 will be described next with reference to the flowcharts in FIGS. 9A and 9B. When the user touches an application icon associated with the browser application 122 or photo viewer application 123, the browser application 122 or photo viewer application 123 is executed and the process in FIG. 9A begins. If the browser application 122 is executed, the CPU 106 displays a user-specified Web page on the display unit 102. If the photo viewer application 123 is executed, the CPU 106 displays image data in the display unit 102. In S1601 of FIG. 9A, the CPU 106 displays a start icon on the display unit 102 for receiving a command to launch the print-and-scan application 121.

In S1603 the CPU 106 determines whether or not a start command for the print-and-scan application 121 has been inputted. The CPU 106 continually returns to S1603 and repeats this determination while a start command has not been inputted (S1603: NO). The CPU 106 advances to S1605 and starts the print-and-scan application 121 when a start command was inputted (S1603: YES).

If a start command is received while a Web page is currently displayed on the display unit 102, in S1605 the CPU 106 reads the URL of the displayed Web page from an area of memory in the RAM 108 used by the browser application 122. The CPU 106 copies this URL to the area of memory in the RAM 108 used by the print-and-scan application 121. On the other hand, if the start command is received while image data is currently displayed on the display unit 102, in S1605 the CPU 106 reads location data including the absolute path of the displayed image data from the memory area of the RAM 108 used by the photo viewer application 123 and copies this location data to the memory area in the RAM 108 used by the print-and-scan application 121.

Figure 9B:
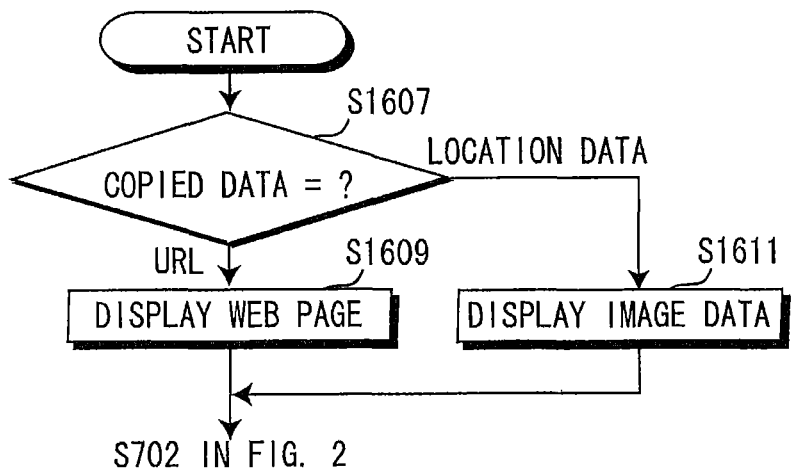

When the print-and-scan application 121 is started up in S1605, the process of FIG. 9B begins. In S1607 of FIG. 9B, the CPU 106 determines whether the data copied to the memory area used by the print-and-scan application 121 is the location of image data or a URL. If the copied data is a URL (S1607: URL), in S1609 the CPU 106 acquires Web data based on the URL. Subsequently, the CPU 106 displays the acquired Web page on the display unit 102 and displays an icon on the display unit 102 for issuing a command to print the displayed Web page. If the copied data is location data, on the other hand (S1607: location data), in S1611 the CPU 106 displays an array of thumbnails for all image data on the display unit 102.

Figure 3:
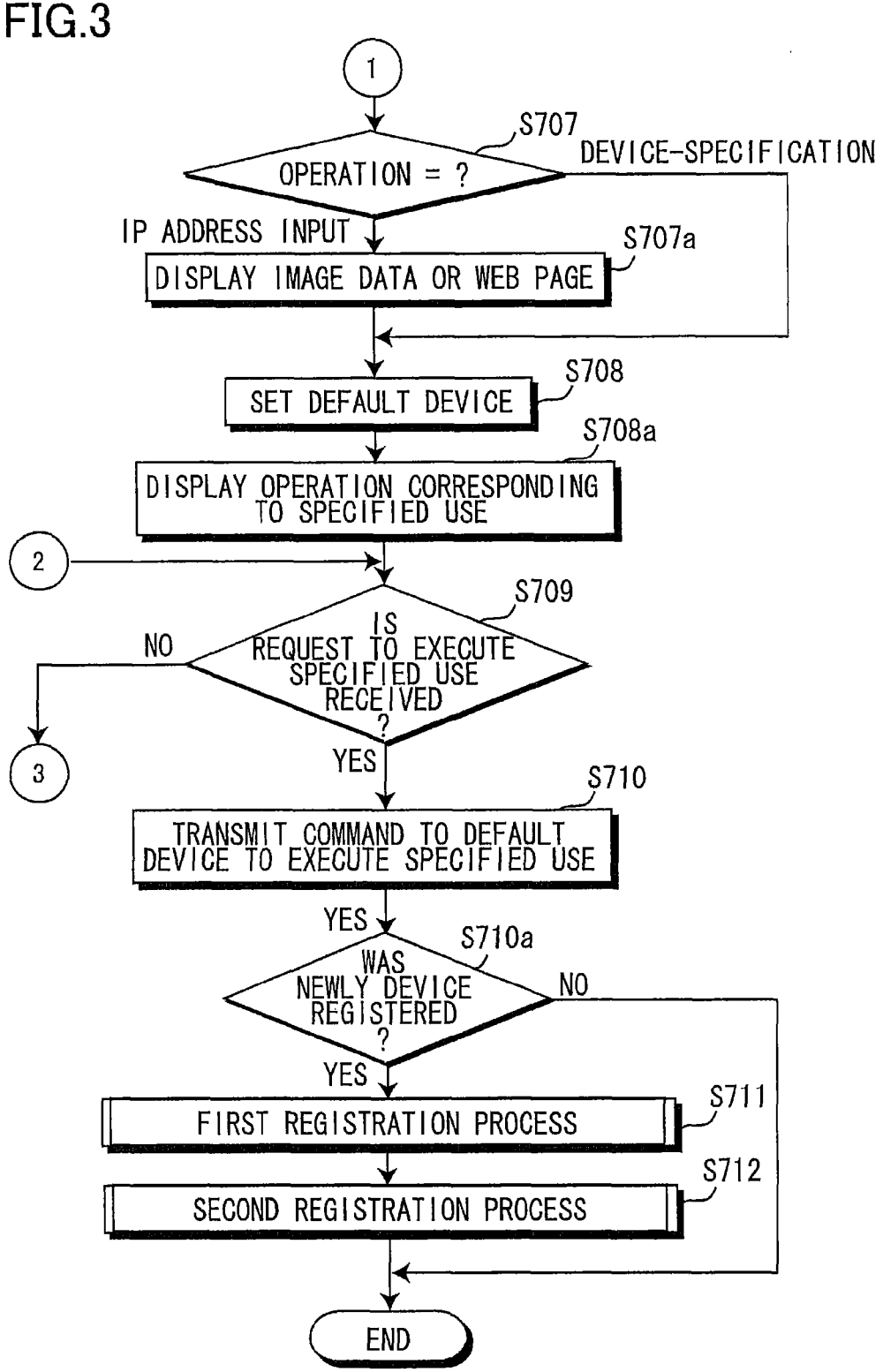

The remaining process is identical to that in S702-S712 of FIGS. 2 and 3 described in the first embodiment and will not be repeated here.

The data processor 100 according to the second embodiment described above has the following effects. The data processor 100 of the second embodiment can start up the print-and-scan application 121 while data used by another application (browser application or photo viewer application) has been specified. In other words, the data processor 100 receives a start command to start up the print-and-scan application 121 while a Web page or image data is currently displayed on the display unit 102. Hence, this configuration can eliminate the need of a user operation to specify a use after starting up the print-and-scan application 121 (S601 in the first embodiment, for example), thereby improving user-friendliness.

While the invention has been described in detail with reference to the first and second embodiments thereof, it would be apparent to those skilled in the art that various changes and modifications may be made therein without departing from the spirit of the invention.

While the table TB1 includes a storage area for each type of use in the embodiments, the invention is not limited to this configuration. For example, the table TB1 may include a storage area for each type of data, such as image data, URLs, and document data. More specifically, the CPU 106 may determine the type of data based on attribute data included in a header of the data or based on a file extension of the data. Accordingly, when the user has specified a type of data, the data processor 100 can display a list of devices supporting the specified data type on the display unit 102 (S706 of the process described in the embodiments).

Further, the types of uses are not limited to photo printing, Web printing, and scanning. For example, there may exist a "Document print" use in which the data processor 100 transmits a command to print document data to a device possessing a printer function and control the device to print the document data.

The function data 604 is not limited to data directly specifying functions that a device can implement, such as the print function data 605, scan function data 606, and copy function data 607, but may also include data that indirectly specifies functions, such as the name and model number of a device. In this case, by storing a table in the storage unit 109 holding correlations between the names and model numbers of devices and their functions, the data processor 100 can identify functions that a device can implement based on their name and model number.

In the first and second embodiments, the data processor 100 requests devices connected to the network to return their model number and functional data and receives the model numbers and functional data returned in response to the request. However, the data processor 100 may be preprogrammed to associate the model numbers and functional data for each device that can be used when executing the print-and-scan application 121 with the print-and-scan application 121. In this case, S707*a* of FIG. 3 may be configured as follows.

The wireless communication interface 105 receives a model number from a device connected to the network. The CPU 106 extracts the model number preprogrammed in the print-and-scan application 121 that matches the model number received by the wireless communication interface 105. The CPU 106 reads functional data for the device having the extracted model number from the print-and-scan application 121. Next, the CPU 106 stores the function data 604 corresponding to the extracted model number and the model number 601 of the device connected to the network in the table TB1 in association with the IP address 602 of the device connected to the network. In this way, the CPU 106 can store the same data described in the first embodiment (FIG. 7) in the table TB1. Further, this configuration eliminates the need for the data processor 100 to communicate with the device in order to acquire the function data 604, which has a larger data size than the model number 601, thereby shortening the process time and reducing the load on the network.

In the process of FIGS. 2 and 3, the CPU 106 may be configured to automatically select and store the most suitable device for the specified use as the default device. In this case, the following steps are performed in place of S706, S707, and S707*a*. The CPU 106 controls the wireless communication interface 105 to broadcast a packet over the network 10 to which the data processor 100 is connected, requesting devices to return their model number and functional data. When each device connected to the network 10 returns its model number and functional data, the CPU 106 controls the wireless communication interface 105 to receive this data. Next, the CPU 106 selects one device that is best-suited to the specified use from among all devices connected to the network based on the model numbers and functional data received by the wireless communication interface 105. The remainder of the process beginning from S708 is identical to that described in the first embodiment.

If the specified use is "Photo print," for example, the CPU 106 may select a device that possesses a color inkjet printing function and that is capable of printing on photo paper, for example, as conditions for selecting the device most suitable for the specified use. If the specified use is "Scan," the CPU 106 may select a device having the highest scanning resolution and being capable of performing color scans, for example, as the conditions for selecting the device most suitable for the specified use. In this case, conditions for selecting devices most suitable for each of the specified uses may be stored in the storage unit 109.

The CPU 106 may also be configured to store a user-specified device as the default device. In this case, it is sufficient to execute only the default device setting in the process of FIGS. 2 and 3. That is, the CPU 106 may execute the process in S710*a*-S712 after the default device is set in S708. After completing the process of S712, the CPU 106 waits for a command to execute the specified use (S709). When an execution command is inputted, the CPU 106 may transmit the command to execute the specified use (S710).

The method of determining whether or not to store a newly registered device in association with non-specified uses is not limited to the method described in S1001*a*, S1102, and S1201*a*. For example, the CPU 106 may be configured to execute the registration process only when the device possesses a color printing function. Alternatively, the CPU 106 may be configured to execute the registration process only when the device possesses a scanning resolution greater than or equal to a threshold value. In addition, the CPU 106 may be configured to prompt the user to indicate whether or not to register the newly registered device in association with non-specified uses and may be configured to execute the registration process only upon receiving user authorization. In the method of executing the registration process only when the device possesses a color printing function, the CPU 106 may determine whether the newly registered device possesses a color printing function in S1001*a* and S1201*a*. In the method of executing the registration process only when the scanning resolution of the device is at least a threshold value, the CPU 106 may also be configured to determine between steps S1102 and S1103 of FIG. 5 whether the scanning resolution exceeds the prescribed value. The CPU 106 advances to S1103 when the scanning resolution exceeds the prescribed value and ends the process of FIG. 5 when the scanning resolution is less than the prescribed value. In this case, the scanning resolution may be acquired in S707*a* of FIG. 3 as data related to the scan function data 606.

In the first embodiment described above, the CPU 106 does not store the IP addresses of devices other than the device that was newly registered in S707 of FIG. 3 in association with non-specified uses in S711 and S712. For example, when the user executed a device-specifying operation in S707 to select the color laser printer 400, the CPU 106 does not store the IP address of the scanner 300 in the table TB1 in S711 or S712. However, the CPU 106 may be configured to store the IP addresses of devices other than the newly registered device in the table TB1 in S711 and S712. This process, executed in place of the process shown in FIG. 5, will be described next with reference to FIG. 10.

The process in FIG. 10 from S1101 through S1103 is identical to the process described in FIG. 5. However, when the CPU 106 determines in S1102 that the newly registered device does not possess a scanner function (S1102: NO), in S1706 the CPU 106 controls the wireless communication interface 105 to broadcast a packet over the network 10 to which the data processor 100 is connected requesting devices to return their model number 601 and function data 604. The CPU 106 then extracts the model numbers of devices possessing a scanner function from among all devices connected to the data processor 100 via the network 10. The CPU 106 then controls the display unit 102 to display a list of the extracted model numbers.

In S1707 the CPU 106 determines whether the user performed an operation on the touchscreen 103 to select a displayed model number 601 or the like (device-specifying operation). The CPU 106 continually repeats the determination in S1707 while a selection has not been received (S1707: NO) and advances to S1708 when a device has been selected (S1707: YES). In S1708 the CPU 106 stores the IP address, the model number 601, and the function data 604 of the selected device in the storage area of the table TB1 for the scan 613, and subsequently ends the process of FIG. 10.

In place of the process in S1706-S1708 of FIG. 10, the CPU 106 may be configured to select the one device most suitable for scanning from among all devices connected to the data processor 100 via the network 10. For example, the CPU 106 may control the wireless communication interface 105 to broadcast a packet over the network 10 to which the data processor 100 is connected requesting devices to return their model number 601 and function data 604. Thereafter, the CPU 106 may automatically select the device having the highest scanning resolution based on the function data 604 returned from all devices connected to the network 10.

The CPU 106 may be configured to execute the process of S701 and S702 of FIG. 2 based on the operating system 124 or other application program already installed on the data processor 100. That is, in S702 the CPU 106 copies location data for image data stored in a memory area of the RAM 108 that is referenced when executing the operating system 124 or another application program to a memory area of the RAM 108 used when executing the print-and-scan application 121. The remaining process beginning from S703 is identical to that described in the first embodiment.

In S1001, S1101, and S1201, the CPU 106 may determine whether the IP address inputted when the user registered a new device (S707) is already stored in a storage area of the table TB1 corresponding to the specified use by determining whether an invalid bit has been set for invalidating the stored IP address. The invalid bit is stored in part of the region of the storage unit 109 used for storing the IP address (normally the first bit). Instead of the invalid bit, a flag for indicating whether the identification data is invalid may be stored in a region separate from the region of the table TB1 for storing the IP address 602, and the CPU 106 may use this flag to determine whether the IP address is already stored in the storage area of the table TB1 corresponding to the specified use.

Although in the preferred embodiments the CPU 106 copies the IP address, model number 601, and function data 604 of the newly registered device to the storage area corresponding to the non-specified use in S1002, S1103, and S1205, the CPU 106 need not store the actual data, but instead may store a pointer needed for referencing the data in the table TB1 as the source for copying.

In S707 of FIG. 3, the process may be configured to allow the user to input a plurality of IP addresses for, registering new devices. In this case, the process from S707 through S709 is as follows. When the CPU 106 determines in S707 that a plurality of IP addresses were inputted (S707: YES), in S707a the CPU 106 stores the IP addresses inputted in S707 in the table TB1 in association with the specified use. The process of S708 described in the preferred embodiment is not executed in this variation. In S708a the CPU 106 displays the model numbers for all devices corresponding to the inputted IP addresses, and subsequently advances to S709.

In order to acquire model numbers for a plurality of devices, the data processor 100 must control the wireless communication interface 105 in S708a to broadcast a packet over the network 10 requesting devices connected to the network 10 to return their model number 601. Subsequently, the CPU 106 stores the IP addresses 602 of devices received by the wireless communication interface 105 that match the inputted IP addresses, as well as the model numbers 601 and function data 604 of the devices in the packets that include these IP addresses in the table TB1 in association with the specified use.

In S709 the CPU 106 determines whether or not a command to execute the specified use was received. That is, the CPU 106 determines whether or not the user touched a region in which a device model number is displayed. If the region in which a model number is displayed was touched (S709: YES), the CPU 106 determines that the user has selected the device having the model number displayed in the touched region. Accordingly, the CPU 106 sets the device having the selected model number as the default device. The remaining process is identical to that described in the first embodiment.

The following process may be performed when the wireless communication interface 105 fails to transmit the command to execute the specified use in S710 of FIG. 3. Upon determining that the transmission by the wireless communication interface 105 failed, the CPU 106 controls the display unit 102 to display a window on the display unit 102 with an error message. The CPU 106 also displays an OK icon in the window. The CPU 106 returns to S704 upon determining that the user has touched a region of the display unit 102 in which the OK icon is displayed. With this configuration, the user can issue a request to reset the default device in S705. Further, after determining that the user touched an area of the error window in which the OK icon is displayed, the CPU 106 may set the default device flag 608 to "off" (invalid) for the device targeted when the transmission failure occurred. After setting the default device flag 608 to "off," the CPU 106 may return to S706.

While the data processor 100 in FIG. 1 is provided with a single input interface 104, the data processor 100 may be provided with a plurality of input interfaces 104. In this case, the CPU 106 may be configured to receive user input from the plurality of input interfaces 104 rather than from the touchscreen 103, as described in the first and second embodiments. Further, the CPU 106 may be configured to receive input from both the touchscreen 103 and input interfaces 104.

The devices connected to the data processor 100 are not limited to the inkjet MFP 200, scanner 300, and color laser printer 400 shown in FIG. 1, provided that they possess at least one of a printer function and scanner function.

Communication between the access point 500 and the devices may be performed either wirelessly or through a wired connection. Further, the data processor 100 may communicate directly with the devices rather than via the access point 500. In this case, the communication connection between the data processor 100 and the device may be either wired or wireless.

The data processor 100 may be configured to receive only the model numbers and functional data of devices possessing a color printing function in S707a of FIG. 3. Specifically, the CPU 106 controls the wireless communication interface 105 to broadcast a packet over the network to which the data processor 100 is connected requesting that devices possessing a color printing function return their model number 601 and function data 604. In this way, only devices possessing a color printing function and connected to the network will return data. The wireless communication interface 105 receives the model numbers 601 and function data 604 from the devices, and the CPU 106 stores the IP addresses 602 of the device received by the wireless communication interface 105 that match the IP addresses inputted in the IP-address-inputting operation, as well as the model numbers 601 and function data 604 in the packets including these IP addresses, in the table TB1. The CPU 106 displays on the display unit 102 a list of model numbers 601 stored in the table TB1 for all devices.

There are various configurations by which the CPU 106 may be triggered to store an inputted IP address and the like in the table TB1 in S707a of FIG. 3. For example, the CPU 106 may be configured to store the inputted IP address in the table TB1 after reconfirming that the data processor 100 can connect to the device identified by this IP address. Through this configuration, the CPU 106 is able to store in the table TB1 only devices with which the data processor 100 can reliably communicate.

In S707a of FIG. 3, the CPU 106 may also determine whether or not the IP address inputted in S707 is already stored in the area of the table TB1 corresponding to the specified use. The CPU 106 does not store the inputted IP address in the table TB1 when the IP address is already stored therein, thereby preventing the same IP address from being registered a plurality of times for a single specified use.

There are a variety of methods by which the CPU 106 may receive the model number 601 and function data 604 in S707a of FIG. 3. For example, the CPU 106 may transmit a packet addressed to an IP address stored in the table TB1 requesting that the device return its model number 601 and function data 604.

Further, the determination in S710a of FIG. 3 may be omitted. Consequently, the CPU 106 executes the process in S711 after the process in S710, even when the user operation received in S707 was a device-specifying operation (S707: device specification).

It is also not necessary that the model numbers of devices preprogrammed in the print-and-scan application 121 match the model numbers of devices connected to the network in their entirety. The CPU 106 may be configured to extract model numbers that are partial matches. For example, when the print-and-scan application 121 is provided with the device model number "Ink-MFP331" and a device connected to the network has the model number "Ink-MFP431," it is clear that the two devices belong to the same series since both model numbers begin with "Ink-MFP." Accordingly, it may be assumed that the device having model number "Ink-MFP431" also possesses an inkjet color printer function, a scanner function, and a copier function. Therefore, the CPU 106 may extract the device having model number "Ink-MFP431" as a device identical to that having model number "Ink-MFP331" provided in the print-and-scan application 121.

The model numbers need not include numbers, but may be configured of only symbols, for example, provided that the model numbers can differentiate devices. Further, device names or other names that can differentiate devices may be used in place of the model numbers.

In S706 of FIG. 2 described in the first embodiment, the CPU 106 controls the display unit 102 to display only model numbers of devices that possess the necessary functions for executing processes related to the specified use, but the invention is not limited to this configuration. For example, the CPU 106 may be configured to display only model numbers for devices possessing a color printing function or only model numbers for devices possessing a color inkjet printing function from among all devices possessing the necessary functions.

Further, devices displayed on the display unit 102 in S706 of FIG. 2 are not limited to those devices stored in the storage area of the table TB1 associated with the specified use. For example, the CPU 106 may be configured to display on the display unit 102 devices found in a search over the network 10. In this case, the CPU 106 may broadcast a packet over the network 10 requesting devices to return various data. The CPU 106 then determines whether or not these devices are suited for the specified use based on the returned data and displays only those devices that are suitable. Alternatively, the CPU 106 may display a list of all devices from which data was returned on the display unit 102, without determining whether the devices are suitable for the specified use. In this case, the CPU 106 may prompt the user to select a device from the list that is suitable for the specified use. In S707 the CPU 106 may determine whether the touchscreen 103 received an operation by the user to select one of these devices, treating the selection operation as a device-specifying operation.

In S706 of FIG. 2, the CPU 106 may be configured not to display data for the default device on the display unit 102. In this way, the CPU 106 can prevent the user from reselecting the device that has already been set as the default.

The method of giving priority to displaying devices on the display unit 102 that are capable of implementing the specified use over devices incapable of implementing the specified use is not limited to the method described in S706 of FIG. 2 for displaying data only for those devices possessing the necessary functions for executing processes related to the specified use, but may be a method of displaying all devices while differentiating in the display between those devices that can implement the specified use and those that cannot. For example, the CPU 106 may display all devices stored in the table TB1 on the display unit 102, regardless of whether the devices can implement the specified use, and may display a prescribed icon next to the data for only those devices that possess the required functions. For example, if the CPU 106 has registered a first device in association with "Scan" as a default device (specified-use) in S708 and the CPU 106 has registered a second device in association with "Scan" (non-specified use) in S701 or S702, the CPU 106 may displays an image representing the first device more preferential than an image representing the second device.

While the IP address is used as data for identifying devices in the above-described embodiments, a URL, MAC address, or the like may be used in place of the IP address. If the MAC address is used, the data processor 100 transmits to the device a MAC frame that includes the MAC address of the device as the destination address and the MAC address of the data processor 100 as the source address. If a URL is used, the CPU 106 acquires the IP address corresponding to the URL and uses the acquired IP address to communicate with the device.

The data processor 100 may also be capable of connecting to an SD card or other external memory and may store the various data in the external memory, rather than in the storage unit 109. For example, the data processor 100 may store the table TB1 in the external memory.

In S601 of FIG. 2, the CPU 106 may be configured to receive a plurality of specified uses from among "Photo print," "Web print," and "Scan" as the use-specifying operation. If the CPU 106 receives "Photo print" and "Web print" as the specified uses, for example, in S706 of FIG. 2, the CPU 106 may display on the display unit 102 the model numbers 601 and IP addresses 602 stored in the regions of the table TB1 corresponding to "Photo print" or "Web print." Alternatively, the CPU 106 may be configured to display on the display unit 102 only the model numbers 601 and IP addresses 602 stored in both regions of the table TB1 corresponding to "Photo print" and "Web print." In this case, in S707a of FIG. 2 the CPU 106 may store the IP address inputted in the IP-address-inputting operation in the table TB1 in association with both "Photo print" and "Web print."

The IP-address-inputting operation in S707 of FIG. 3 may be an operation for inputting data other than the IP address of a device being newly registered, such as the model number, MAC address, or serial number of the device.

What is claimed is:

1. A data processing device connected with a first device possessing a plurality of attributes including a first attribute, each of the plurality of attributes relating to at least one process that can be executed by the first device, the data processing device comprising:
- a display unit;
- an operating unit configured to enable a user to input operation data;
- a processor; and
- a storage unit storing computer readable instructions that, when executed by the processor, cause the data processing device to function as:
  - an attribute specifying unit configured to specify one of the plurality of attributes based on the operation data;
  - a first display control unit configured to display a first list image on the display unit when the attribute specifying unit specifies the first attribute, the first list image representing a list of model numbers and IP addresses of devices that are configured to perform a process relating to the first attribute, the first list image including a first portion that represents a model number of the first device and an IP address of the first device;
  - a device specifying unit configured to specify first identification data when the first portion is selected based on the operation data, the first identification data identifying the first device and including the model number of the first device and the IP address of the first device;
  - a first registering unit configured to register the first identification data in association with the first attribute into the storage unit when the device specifying unit specifies the first device and the attribute specifying unit specifies the first attribute;
  - a first transmitting unit configured to transmit an instruction to perform a process relating to the first attribute to the first device when the attribute specifying unit specifies the first attribute and the device specifying unit specifies the first device;
  - a second registering unit configured to register the first identification data in association with a second attribute other than the first attribute into the storage unit if the plurality of attributes further includes the second attribute when the first registering unit registers the first identification data in association with the first attribute into the storage unit;
  - a second display control unit configured to display a second list image on the display unit when the attribute specifying unit specifies the second attribute and the first identification data is registered in association with the second attribute, the second list image representing a list of model numbers and IP addresses of devices that are configured to perform a process relating to the second attribute, the second list image including a first image representing the model number of the first device and the IP address of the first device that are included in the first identification data;
  - an image selecting unit configured to select the first image representing the model number of the first device and the IP address of the first device based on the operation data when the second display control unit displays the first image on the display unit; and
  - a second transmitting unit configured to transmit an instruction to perform the process relating to the second attribute to the first device when the image selecting unit selects the first image.

2. The data processing device according to claim 1, wherein the data processing device is connected with a plurality of devices including the first device and a second device, the second device possessing the second attribute;
   - wherein the device specifying unit is further configured to specify second identification data based on the operation data, the second identification data identifying the second device;
   - wherein the first registering unit is further configured to register second identification data identifying the second device in association with the second attribute into the storage unit when the device specifying unit specifies the second identification data and the attribute specifying unit specifies the second attribute;
   - wherein the first transmitting unit is configured to transmit an instruction to perform a process relating to the second attribute to the second device when the device specifying unit specifies the second identification data and the attribute specifying unit specifies the second attribute;
   - wherein the display control unit displays, if the first registering unit registers the second identification data in association with the second attribute and the second registering unit registers the first identification data in association with the second attribute, the first image and a second image representing the second identification data on the display unit when the attribute specifying unit specifies the second attribute, the displaying unit displaying the second image more preferentially than the first image;
   - wherein the image selecting unit is configured to select one of the first image and the second image based on the operation data when the display control unit displays the first image and the second image on the display unit; and
   - wherein when the image selecting unit selects one of the first image and the second image, the second transmitting unit transmits an instruction to perform a process relating to the second attribute to one of the first device and the second device corresponding to the one of the first image and the second image.

3. The data processing device according to claim 1, wherein when the storage unit has already stored the first identification data in association with the second attribute, the second registering unit fails to register the first identification data in association with the second attribute again.

4. The data processing device according to claim 1, wherein the data processing device is further configured to function as a judging unit configured to judge whether or not the first device possesses the second attribute when the first registering unit registers the first device in association with the first attribute; and
   - wherein when the judging unit judges that the first device does not possess the second attribute, the second registering unit fails to register the first identification data in association with the second attribute in the storage unit.

5. The data processing device according to claim 4, further comprising a receiving unit configured to receive, from the first device, function information indicating functions that the first device possesses;
   - wherein when the receiving unit receives the function information indicating that the first device does not possess a function relating to the second attribute, the judging unit judges that the first device does not possess the second attribute.

6. The data processing device according to claim 5, wherein when the device specifying unit specifies the first device and the attribute specifying unit specifies the first attribute, the first registering unit further registers the function information of the first device in association with the first identification data in the storage unit; and
   - wherein when the function information of the first device indicates that the first device does not possess a function relating to the second attribute, the judging unit judges that the first device does not possess the second attribute.

7. The data processing device according to claim 5 or claim 6, wherein the data processing device is connected with a plurality of devices including the first device; and wherein if the first registering unit registers a plurality of sets of identification data identifying a plurality of devices in association with the first attribute in the storage unit, the display control unit displays on the display unit an image representing identification data indicative of a device whose function information indicates that the device possesses a function for performing a process relating to the second attribute more preferentially than an image representing identification data indicative of a device that does not possess a function for performing a process relating to the second attribute when the attribute specifying unit specifies the second attribute.

8. The data processing device according to claim 1, wherein the data processing device is further configured to function as a judging unit configured to judge whether or not the first device possesses a predetermined function sufficient to perform a process relating to the second attribute if the second attribute is a predetermined attribute;

wherein when the judging unit judges that the first device does not possess the predetermined function, the second registering unit registers the first identification data in association with the second attribute in the storage unit with a predetermined restriction; and wherein when the judging unit judges that the first device possesses the predetermined function, the second registering unit registers the first identification data in association with the second attribute in the storage unit without the predetermined restriction.

9. The data processing device according to claim 8, wherein the data processing device is further configured to function as a receiving unit configured to receive, based on the operation data, an instruction to register the first identification data in association with the predetermined attribute in the storage unit when the first device does not possess the predetermined function;

wherein the second registering unit registers the first identification data in association with the second attribute when the receiving unit receives the instruction; and wherein the second registering unit fails to store the first identification data in association with the second attribute when the receiving unit does not receive the instruction.

10. The data processing device according to claim 1, wherein the data processing device is further configured to function as a judging unit configured to judge whether or not the first device possesses a predetermined function sufficient to perform a process relating to the second attribute if the second attribute is a predetermined attribute; and wherein when the judging unit judges that the first device does not possess the predetermined function, the second registering unit fails to register the first identification data in association with the second attribute in the storage unit.

11. The data processing device according to claim 1, wherein when the device specifying unit specifies the first identification data before the first identification data is registered in association with the first attribute and the second attribute, the second registering unit registers the first identification data in association with the second attribute into the storage unit.

12. The data processing device according to claim 1, wherein when the attribute specifying unit specifies the second attribute and the first identification data is registered in association with the second attribute in the storage unit, the display control unit displays an entry field for inputting identification data in addition to the first image; and wherein when identification data is inputted through the entry field, the first registering unit further registers a device identified by the identification data inputted through the entry field in association with the first attribute into the storage unit.

13. The data processing device according to claim 12, wherein the second registering unit registers identification data inputted through the entry field in association with the second attribute into the storage unit if a device identified by the identification data inputted through the entry field possesses the second attribute.

14. The data processing device according to claim 1, wherein the first attribute indicates one of: a type of use achieved by the first device; and a type of data processed by the first device.

15. The data processing device according to claim 14, wherein the type of use includes at least one of a photo print use, a Web page print use, a document print use, and a scan use.

16. A method executed by a computer connected with a device, the device possessing a plurality of attributes including a first attribute, each of the plurality of attributes relating to at least one process that can be executed by the device, the method comprising:

specifying, by the computer, one of the plurality of attributes based on operation data inputted by a user through an operating unit of the computer;

displaying, on a display unit of the computer, a first list image on the display unit when the attribute specifying unit specifies the first attribute, the first list image representing a list of model numbers and IP addresses of devices that are configured to perform a process relating to the first attribute, the first list image including a first portion that represents a model number of the device and an IP address of the device;

specifying, by the computer, identification data when the first portion is selected based on the operation data, the identification data identifying the device and including the model number of the device and the IP address of the device;

registering, by the computer, the identification data in association with the first attribute into a storage unit of the computer when the device is specified and the first attribute is specified;

transmitting an instruction to perform a process relating to the first attribute to the device when the first attribute is specified and the device is specified based on the operation data;

registering the identification data in association with a second attribute, other than the first attribute, into the storage unit if the plurality of attributes further includes the second attribute when the identification data is registered in association with the first attribute in the storage unit;

displaying, on the display unit, a second list image when the second attribute is specified and the identification data is registered in association with the second attribute, the second list image representing a list of model numbers and IP addresses of devices that are configured to perform a process relating to the second attribute, the second list image including an image representing the model number of the device and the IP address of the device that are included in the identification data;

selecting, by the computer, the image representing the model number of the device and the IP address of the device based on the operation data when the image is displayed on the display unit; and transmitting an instruction to perform the process relating to the second attribute to the device when the image is selected.

17. A non-transitory computer readable storage medium storing instructions installable on and executable by a computer connected with a device, the device possessing a plurality of attributes including a first attribute, each of the plurality of attributes relating to at least one process that can be executed by the device, wherein the instructions, when executed, cause the computer to:

specify one of the plurality of attributes based on operation data inputted by a user through an operating unit of the computer;

display, on a display unit of the computer, a first list image on the display unit when the attribute specifying unit specifies the first attribute, the first list image representing a list of model numbers and IP addresses of devices that are configured to perform a process relating to the first attribute, the first list image including a first portion that represents a model number of the device and an IP address of the device;

specify identification data when the first portion is selected based on the operation data, the identification data identifying the device and including the model number of the device and the IP address of the device;

register the identification data in association with the first attribute into a storage unit of the computer when the device is specified and the first attribute is specified;

transmit an instruction to perform a process relating to the first attribute to the first device when the first attribute is specified and the device is specified based on the operation data;

register the identification data in association with a second attribute, other than the first attribute, into the storage unit if the plurality of attributes further includes the second attribute when the identification data is registered in association with the first attribute in the storage unit;

display, on the display unit, a second list image when the second attribute is specified and the identification data is registered in association with the second attribute, the second list image representing a list of model numbers and IP addresses of devices that are configured to perform a process relating to the second attribute, the second list image including an image representing the model number of the device and the IP address of the device that are included in the identification data;

select the image representing the model number of the device and the IP address of the device based on the operation data when the image is displayed on the display unit; and transmit an instruction to perform the process relating to the second attribute to the device when the image is selected.

18. The data processing device according to claim 1, wherein the first list image further represents an entry field on which a user can input an IP address through the operating unit;

wherein the device specifying unit is further configured to specify second identification data of a second device based on the IP address inputted on the entry field; and wherein the first registering unit is further configured to register the second identification data in association with the first attribute into the storage unit when the attribute specifying unit specifies the first attribute and the device specifying unit specifies the second identification data.

19. The data processing device according to claim 18, wherein the devices included in the list represented by the first list image include another device other than the first device, the another device being registered in association with the first attribute in the storage unit before the first registering unit registers the first device in association with the first attribute in the storage unit.

20. The data processing device according to claim 1, wherein the first display control unit displays the first list image on the display unit when at least one of condition (a) and condition (b) is met:

(a) a plurality of sets of identification data is registered in association with the first attribute in the storage unit and default device data is not registered with the first attribute in the storage unit, the plurality of sets of identification data identifying a plurality of devices, respectively, each identification data set including a model number of a corresponding one device and an IP address of the corresponding one device; and (b) a request to reset the default device is inputted through the operating unit.

* * * * *